No. 660,680. Patented Oct. 30, 1900.
J. T. CONN.
FASTENING DEVICE.
(Application filed July 7, 1900.)
(No Model.)
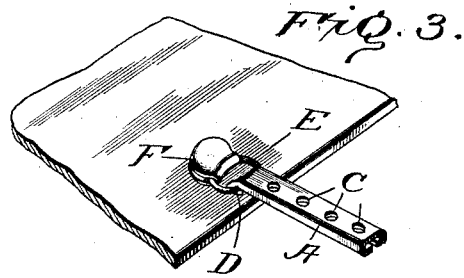
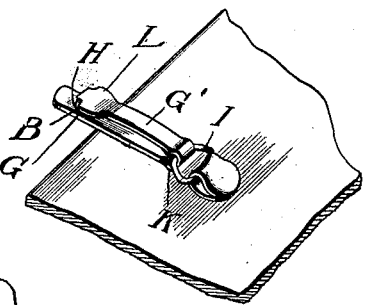
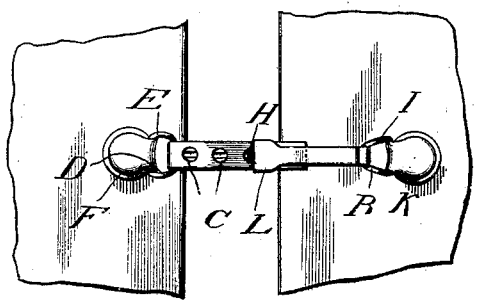
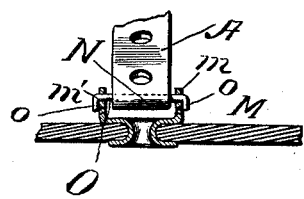
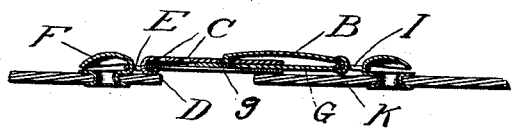
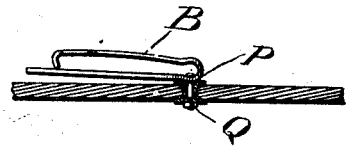

UNITED STATES PATENT OFFICE.

JULIUS T. CONN, OF LANSING, MICHIGAN.

FASTENING DEVICE.

SPECIFICATION forming part of Letters Patent No. 660,680, dated October 30, 1900.

Application filed July 7, 1900. Serial No. 22,791. (No model.)

*To all whom it may concern:*

Be it known that I, JULIUS T. CONN, a citizen of the United States, residing at Lansing, in the county of Ingham and State of Michigan, have invented certain new and useful Improvements in Fastening Devices; and I do hereby declare the following to be a full, clear, and exact description of the invention, such as will enable others skilled in the art to which it appertains to make and use the same.

This invention relates to improvements in fastening devices, and is more especially adapted for fastening devices for shoes and the like.

The objects of the invention are to provide a simple and inexpensive fastening device which will enable the ready securing and detaching of the two members of the device, to produce a fastening device for shoes or the like to replace the troublesome lacing or buttons commonly employed, to produce a simple and efficient fastening device which can be quickly and easily applied to the ordinary lace or buttoned shoe by an unskilled person, and to produce a generally improved, simplified, and efficient fastening device for shoes and the like.

With such and other objects in view the invention is embodied in the novel parts, arrangement, and combinations of parts hereinafter described, and particularly set forth in the claims.

In the accompanying drawings I have illustrated practical embodiments of the invention, but desire it understood that I do not wish to be limited to the particular constructions which for the sake of illustration I have there shown.

In the drawings, Figure 1 shows in elevation a fastening device embodying my invention and shows the same as applied to a laced shoe. Fig. 2 is a longitudinal sectional view through the fastening device and a portion of the shoe. Fig. 3 is a perspective view of one member of the fastening device. Fig. 4 is a perspective view of the other member of the fastening device. Fig. 5 is a perspective view illustrating a modified construction of means for securing the two members to the shoe or the like. Fig. 6 is another modified construction of means for securing the members of the device to a shoe or the like.

Referring to the drawings, the fastening device comprises, generally speaking, two members A and B, each secured to one side or portion of the upper of a shoe or the like, the members slidably engaging each other and having means for holding the members together in different positions, so as to bring the sides of the shoe-upper nearer together or hold them farther apart, as is desired. The member A of the device, as will be seen from the drawings, is in the form of a tube or sheath and is preferably flattened, though this, as will be evident, is not necessary. The tube is provided along one side with a series of perforations or holes C and is secured at one end in any convenient or suitable manner to the shoe or the like. In the drawings I have shown various modes of securing the sheath to the shoe. As shown in Figs. 1 and 2, the sheath A is provided at one end with a hooked tongue or projection D, which may be formed by flattening or removing a portion of the tube. The hook D in Figs. 1 and 2 engages in a link or eye E, which is secured to a lacing-stud F, which is secured to the shoe in a well-known manner and is of a well-known construction. The other member B of the fastening device comprises an elongated body portion G, of the size and shape to enter the tube or sheath A and slide back and forth therein, and a spring-tongue G', secured at one end to the body G and having at or near its opposite end a beak or hook H, adapted to engage in any one of the holes C in the sheath. The hook H extends at an acute angle to the spring-tongue G' or is bent backward slightly, so that when the hook engages in one of the openings C it cannot be disengaged therefrom by a pull on the members of the fastening device. Preferably the body portion G is provided with a hole g opposite the hook or beak H, and this hole is adapted to receive the end of the beak H extending through one of the openings C in the sheath, and thereby prevent the breaking off of the beak if unusual strain is brought to bear on the members of the fastening device. The member B of the fastening device may be secured in various manners to the shoe or the like. For instance, as shown in Figs. 1 and 2, it is secured, similarly to the member A, to a lacing-stud by means of a link or eye I, which engages with the lacing-stud and with a loop or eye K at the end of the member B. This loop K may be readily formed by forming the tongue and body of the member B of a single piece of metal bent upon itself. The tongue G' is provided conveniently near its outer end with projecting ears or lugs L, extending beyond the sides of the sheath, so as to enable one in using the device to readily grasp the tongue and lift the beak H out of the hole C, in which it is engaged.

As above stated, various means may be employed for securing the members A and B to the shoe or the like.

In Fig. 5 I have shown another form of means for securing the members to the shoe, comprising a securing device M, fastened in any convenient manner to the shoe and having upwardly-projecting opposite lugs m, provided with registering perforations m'. Through these perforations and through a hook or loop N on the end of a member of the fastening device passes a pivot O, which may be retained in place as by means of hooked or bent ends o. It will be understood that both members A and B of the fastening device can be secured in the same way.

In Fig. 6 another means is shown for securing the members of the fastening device to the shoe. This means comprises a screw-threaded stud P, secured to the end of the fastening member and adapted to project through a hole or eyeleted hole, which, by the way, may be the ordinary lace-hole of a shoe, and engage with a screw-threaded nut Q. It is evident that the devices P and Q may be in the forms, respectively, of a rivet and washer, the rivet being swaged over the washer to retain the parts in engagement.

It is thought the use of the device will be readily understood. To secure the members of the fastening device together, it is simply necessary to insert the end of the body G which extends beyond the beak H into the end of the sheath A and press the body home in the sheath. The beak being rearwardly inclined will cause the spring-tongue to ride on the outside of the sheath until the beak engages in the desired hole C. The members cannot then be separated until the tongue is moved to carry the beak out of the hole, which can be done by grasping the ears on the spring-tongue with the fingers. In cases where the fastening members are flexibly connected to the shoe they can be readily disengaged by grasping the member B beyond the end of the sheath and bowing or bending the same slightly outward, which will also cause the beak to disengage the hole in which it is located.

It will be understood that the fastening device above described constitutes a simple and effective fastening for a shoe or the like. The body G of the member B, being sheathed or telescoped into the tooth A for a considerable distance, is held rigidly by the walls of the sheath and prevented from side deflection or movement.

Having thus described the invention, what I claim as new, and desire to secure by Letters Patent, is—

1. In a fastening device, the combination of a member in the form of an elongated sheath having along one side thereof a series of holes, a second member having a long slender body portion telescoping in said sheath and having a long slender spring-tongue secured at or near one end of the body portion and extending substantially parallel with the body portion outside of said sheath, said tongue having a beak adapted to engage in one of said holes in the sheath, substantially as described.

2. In a fastening device, the combination of a member in the form of an elongated sheath having along one side thereof a series of holes, a second member having a long slender body portion telescoping in said sheath, and having a long slender tongue secured at or near one end of the body portion and extending substantially parallel with the body portion outside of the sheath, said tongue having a beak adapted to engage in one of said holes in the sheath, and said tongue having ears L projecting laterally beyond the sides of the sheath, substantially as described.

3. In a fastening device for shoes or the like, the combination of a member secured at one end to the shoe or the like, and being of tubular form provided along one side with a series of holes, a second fastening member secured at one end to the shoe or the like and having a body portion adapted to slidably engage in said tubular member, and a spring-tongue having at or near its end a beak adapted to extend into one of said holes and engage a hole in the body portion, substantially as described.

In testimony whereof I affix my signature in presence of two witnesses.

JULIUS T. CONN.

Witnesses:
ETTA H. GARDINE,
C. C. WOOD.